(12) United States Patent
Westerink et al.

(10) Patent No.: US 8,616,631 B2
(45) Date of Patent: Dec. 31, 2013

(54) SEAT PAN ASSEMBLY

(75) Inventors: Rik Westerink, Corinth, TX (US);
Armando Valdes, Denton, TX (US);
Brad Grunwald, Garland, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 317 days.

(21) Appl. No.: 12/953,263

(22) Filed: Nov. 23, 2010

(65) Prior Publication Data
US 2011/0148173 A1    Jun. 23, 2011

Related U.S. Application Data

(60) Provisional application No. 61/281,844, filed on Nov. 23, 2009.

(51) Int. Cl.
*A47C 7/62*    (2006.01)

(52) U.S. Cl.
USPC .............. 297/188.1; 297/188.08; 297/188.09; 297/331

(58) Field of Classification Search
USPC ............. 297/188.1, 331, 335, 188.08, 188.09
See application file for complete search history.

(56) References Cited

U.S. PATENT DOCUMENTS

| | | | |
|---|---|---|---|
| 3,059,964 A * | 10/1962 | Makowski et al. | ............. 297/13 |
| 3,468,582 A | 9/1969 | Judd | |
| 3,762,766 A | 10/1973 | Bareski et al. | |
| 5,133,587 A | 7/1992 | Hadden, Jr. | |
| 5,158,338 A * | 10/1992 | Hayakawa et al. | ........... 297/335 |
| 5,174,526 A | 12/1992 | Kanigowski | |
| 5,409,186 A | 4/1995 | Chow | |
| 5,707,103 A * | 1/1998 | Balk | ............................... 297/13 |
| 5,740,989 A | 4/1998 | Daines | |
| 5,829,836 A | 11/1998 | Schumacher et al. | |
| 6,038,426 A | 3/2000 | Williams, Jr. | |
| 6,115,239 A * | 9/2000 | Kim | ......................... 361/679.57 |

(Continued)

FOREIGN PATENT DOCUMENTS

| | | |
|---|---|---|
| DE | 10237398 | 2/2004 |
| DE | 102005059192 | 7/2007 |

(Continued)

OTHER PUBLICATIONS

Selected drawings of portions of Model 5700/5750 seat, Jun. 2005, two pages.

(Continued)

*Primary Examiner* — Philip Gabler
(74) *Attorney, Agent, or Firm* — Dean W. Russell; Tiffany L. Williams; Kilpatrick Townsend & Stockton LLP

(57) ABSTRACT

Embodiments of the present invention include a passenger seat with a seat frame having at least one coupling projection and a seat pan assembly having at least one coupling retainer. The coupling retainer is configured to releasably engage the coupling projection via at least one locking device. The seat pan assembly is disengaged from the passenger seat by removing the locking device, disengaging the coupling retainer, and rotating the seat pan assembly to an open position.

13 Claims, 6 Drawing Sheets

(56) References Cited

U.S. PATENT DOCUMENTS

| | | |
|---|---|---|
| 6,237,994 B1 | 5/2001 | Bentley et al. |
| 6,244,649 B1 * | 6/2001 | Scheck et al. ............. 296/65.03 |
| 6,742,840 B2 * | 6/2004 | Bentley ..................... 297/316 |
| 6,761,398 B2 | 7/2004 | Bentley et al. |
| 6,776,457 B2 | 8/2004 | Muin et al. |
| 6,824,213 B2 | 11/2004 | Skelly et al. |
| 6,863,344 B2 | 3/2005 | Smallhorn |
| 6,899,390 B2 | 5/2005 | Sanfrod et al. |
| 7,002,265 B2 | 2/2006 | Potega |
| 7,143,978 B2 | 12/2006 | Smallhorn |
| 7,261,266 B2 * | 8/2007 | Satterfield ................. 248/284.1 |
| 7,520,469 B2 | 4/2009 | Baumann |
| 7,520,566 B2 | 4/2009 | Braun |
| 7,926,873 B2 | 4/2011 | Rombouts |
| 2003/0107248 A1 | 6/2003 | Sanford et al. |
| 2003/0209929 A1 | 11/2003 | Muin et al. |
| 2004/0212228 A1 | 10/2004 | Skelly et al. |
| 2006/0163917 A1 * | 7/2006 | Schroeder et al. ......... 297/188.1 |
| 2009/0058165 A1 * | 3/2009 | Rombouts ................ 297/452.18 |

FOREIGN PATENT DOCUMENTS

| | | |
|---|---|---|
| EP | 1348625 | 10/2003 |
| EP | 1393968 | 3/2004 |
| EP | 1647483 | 4/2006 |
| GB | 2417197 | 2/2006 |
| WO | WO02096700 | 12/2002 |
| WO | WO2009012294 | 1/2009 |

OTHER PUBLICATIONS

Selected pages from Model 5700/5750 Overview, undated, two pages.

Selected pages from Technical Proposal, "Passenger Seating for Asiana B747-400 Aircraft," Mar. 8, 2006, three pages.

International Search Report and Written Opinion dated Jan. 29, 2009 in related International Application Serial No. PCT/US2008/070142.

International Search Report and Written Opinion dated Jul. 6, 2011 in related Application No. PCT/US2010/057850.

* cited by examiner

SEAT PAN ASSEMBLY

CROSS REFERENCE TO RELATED APPLICATIONS

This application is related to and claims priority benefits from U.S. Provisional Application Ser. No. 61/281,844, filed on Nov. 23, 2009, entitled BOTTOM PAN QUICK RELEASE MECHANISM. The '844 application is hereby incorporated in its entirety by this reference.

FIELD OF THE INVENTION

The field of the invention relates to passenger seats or the like.

BACKGROUND

In many instances, passenger seats include a wide assortment of personal electronic and entertainment options to encourage passengers to remain seated as much as possible during transport for safety, crew mobility, and to enable efficient cabin service. Some passenger seats may provide video and audio entertainment, including television, video games, internet access, and other in-flight entertainment ("IFE") components. Typically, these entertainment devices are mounted in the seat backs and arm rests of the passenger seats. In some cases, the passenger seats are equipped with power outlets to allow passengers to operate their own personal electronic devices without the need for battery power.

Due to constraints within the transport vehicle, space is limited for storage of the IFE equipment. The IFE equipment, including the electrical wiring, components, processor unit, etc. is typically stored within an IFE box. Conventionally, the IFE box is mounted on the side of the seat frame leg structure, thus inhibiting leg room, storage space under the passenger seat. More recently, as described in U.S. Patent Publication No. 2009/0058165, the IFE box has been stored underneath the passenger seat pan. The current passenger seat design allows technicians to unlock and raise the seat pan to access the IFE box for repair and maintenance, but the required steps to do so can be cumbersome and time consuming. Thus, it is desirable to provide a passenger seat design that allows a technician to quickly release and raise the seat pan in a quick and efficient manner to enable a more timely and successful repair.

SUMMARY

Embodiments of the present invention include a passenger seat with a seat frame having at least one coupling projection and a seat pan assembly. The seat pan assembly may include a seat pan, at least one coupling retainer, and a pan frame. A box comprising in-flight entertainment equipment may be coupled to the seat frame below the seat pan assembly.

The seat pan assembly is pivotally coupled to the seat frame and the coupling retainer is configured to releasably engage the coupling projection via at least one locking device. The seat pan assembly may be disengaged from the passenger seat by removing the locking device from the coupling retainer, disengaging the coupling retainer from the coupling projection, and rotating the seat pan assembly to an open position relative to the seat frame.

In some embodiments, the passenger seat is rotated to a fully upright position prior to removing the locking device from the coupling retainer and disengaging the coupling retainer from the coupling projection by sliding the coupling retainer from an engaged position to a disengaged position. In other embodiments, the coupling retainer is disengaged from the coupling projection by pivoting the coupling retainer from an engaged position to a disengaged position.

DETAILED DESCRIPTION

Figure 1:
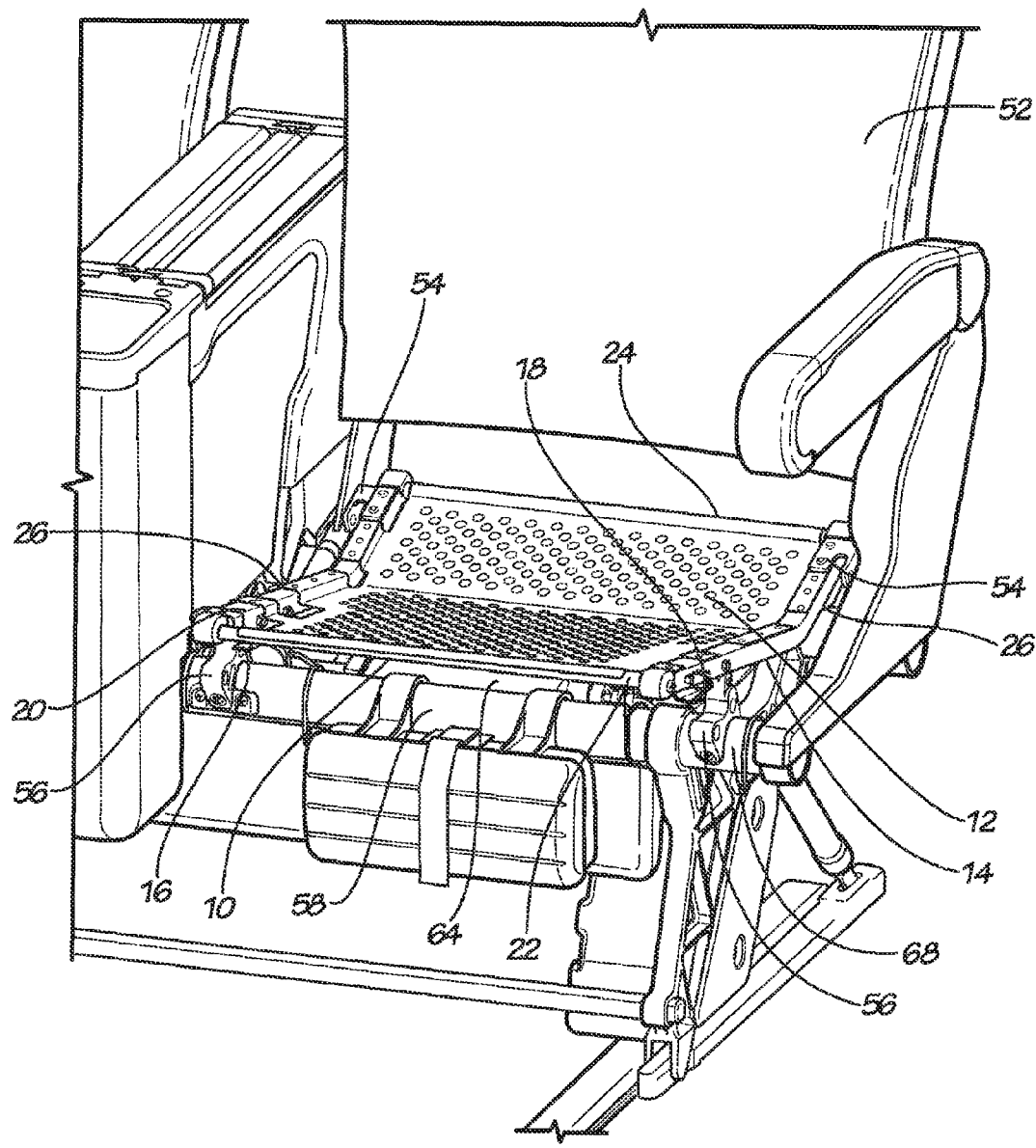
FIG. 1 is a perspective view of a seat pan assembly according to one embodiment of the present invention in an engaged, closed position relative to a passenger seat.

Embodiments of the invention provide seat pan assemblies for use with a passenger seat. While the seat pan assemblies are discussed for use with aircraft seats, they are by no means so limited. Rather, embodiments of the seat pan assemblies may be used in passenger seats or other seats of any type or otherwise as desired.

FIGS. 1-6 illustrate one embodiment of a seat pan assembly 10. In this embodiment, the seat pan assembly 10 comprises a seat pan 12, a pan frame 14, at least one coupling retainer 16, and at least one locking device 18.

The seat pan 12 may be formed of materials including but not limited to aluminum, stainless steel, other metallic materials, composite materials, or other similar materials that provides sufficient strength to withstand the load applied by a seated passenger. In some embodiments, such as the embodiment shown in FIGS. 1-4 and 6, the seat pan 12 may include a design having multiple apertures throughout the surface to reduce the weight of the seat pan 12. The seat pan 12 may, but not necessarily, include a plurality of flanges 20 around its perimeter that are configured to couple the seat pan 12 to the pan frame 14.

In some embodiments, the pan frame 14 comprises a forward bar 22, an aft bar 24, and two side bars 26. In some embodiments, the plurality of flanges 20 are coupled to the bars 22, 24, and 26 via mechanical fasteners including but not limited to screws, bolts, rivets, or other suitable mechanical fastening devices. One of ordinary skill in the relevant art will understand that any suitable means may be used to secure the seat pan 12 the pan frame 14 including but not limited to any suitable mechanical or chemical fasteners or integral formation between the seat pan 12 and the pan frame 14.

In some embodiments, such as the embodiment illustrated in FIGS. 2-5, the coupling retainer 16 includes a main body 28 and a lip 30. The main body 28 includes at least two slotted holes 32 and a locking receiver 34. The main body 28 is configured to couple to an interior surface 36 of the side bar 26 so that the lip 30 is located some amount of distance below the side bar 26. In some embodiments, a variety of nylon washers, steel washers, and spring washers are used in combination with a mechanical fastener to secure the coupling retainer 16 to the side bar 26. In some embodiments, such as the embodiment best illustrated in FIG. 2, a mechanical fastener 38 is inserted through an aperture 40 in the side bar 26. In the particular embodiment shown in FIG. 2, the mechanical fastener 38 is a bolt. However, any suitable mechanical fasteners may be used including but not limited to screws, bolts, rivets, or other suitable mechanical fastening devices.

Figure 2:
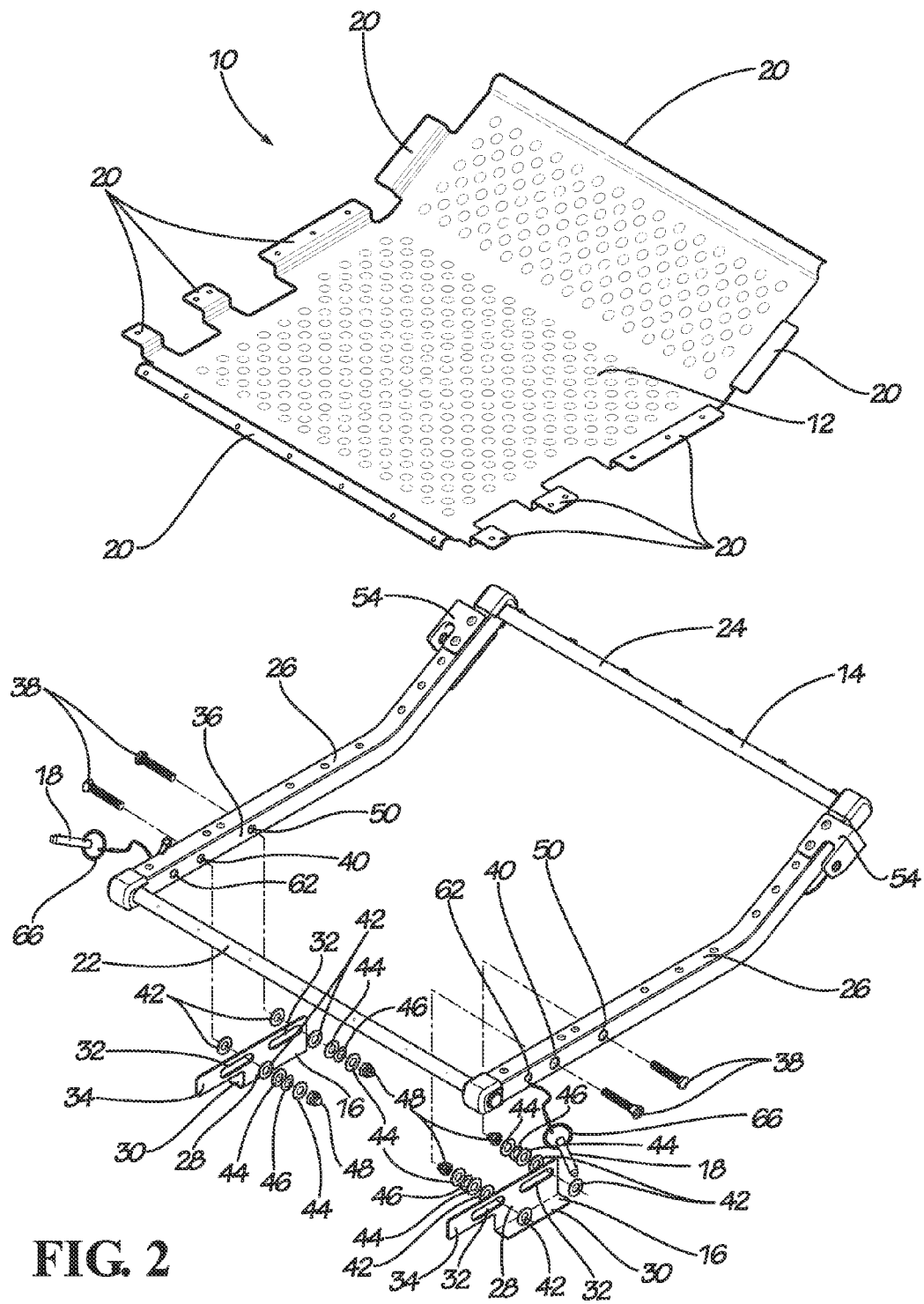
FIG. 2 is an exploded perspective view of the seat pan assembly of FIG. 1.

In some embodiments, such as the embodiment best illustrated in FIG. 2, a nylon washer 42 is placed around the mechanical fastener 38. The mechanical fastener 38 is then inserted through one of the at least two slotted holes 32 on the coupling retainer 16. Another nylon washer 42 is then placed around the mechanical fastener 38 so that the two nylon washers 42 sandwich both sides of the coupling retainer 16. By placing the nylon washers 42 adjacent both sides of the coupling retainer 16, the coupling retainer 16 experiences less friction when sliding along the path created by the slotted hole 32 relative to the mechanical fastener 38.

In this embodiment, a steel washer 44 is positioned adjacent the second nylon washer 42, followed by at least one spring washer 46, and another steel washer 44. The spring washer 46 is included to maintain a tight coupling between the coupling retainer 16 and the side bar 26 to prevent seat rattle. The steel washers 44 are positioned adjacent the spring washer 46 to prevent wear between the spring washer 46 and the nylon washer 42 when the spring washer 46 expands and contracts. In some embodiments, the spring washer 46 includes two or more spring washers 46. In other embodiments, such as the embodiment shown in FIG. 2, the spring washer 46 is a single spring washer 46. In these embodiments, the force exerted by the spring washer 46 is less than 30 pounds, and preferably less than 20 pounds.

Finally, in this embodiment, a fastening nut 48 is coupled to the end of the mechanical fastener 38. A similar configuration is used to couple the side bar 26 to the second slotted hole 32 on the coupling retainer 16 via another aperture 50 located aft of the aperture 40.

One of ordinary skill in the relevant art will understand that the combination of fasteners, slotted holes, and nylon, steel, and spring washers described above is but one exemplary embodiment of a suitable fastening arrangement between the coupling retainer 16 and the side bar 26. Any suitable number and arrangement of washers, slotted holes, and fasteners is contemplated that allow the coupling retainer 16 to slide relative to the side bar 26 when pressure is applied, while otherwise maintaining a snug fit between the components to avoid undesirable seat rattle.

Figure 6:
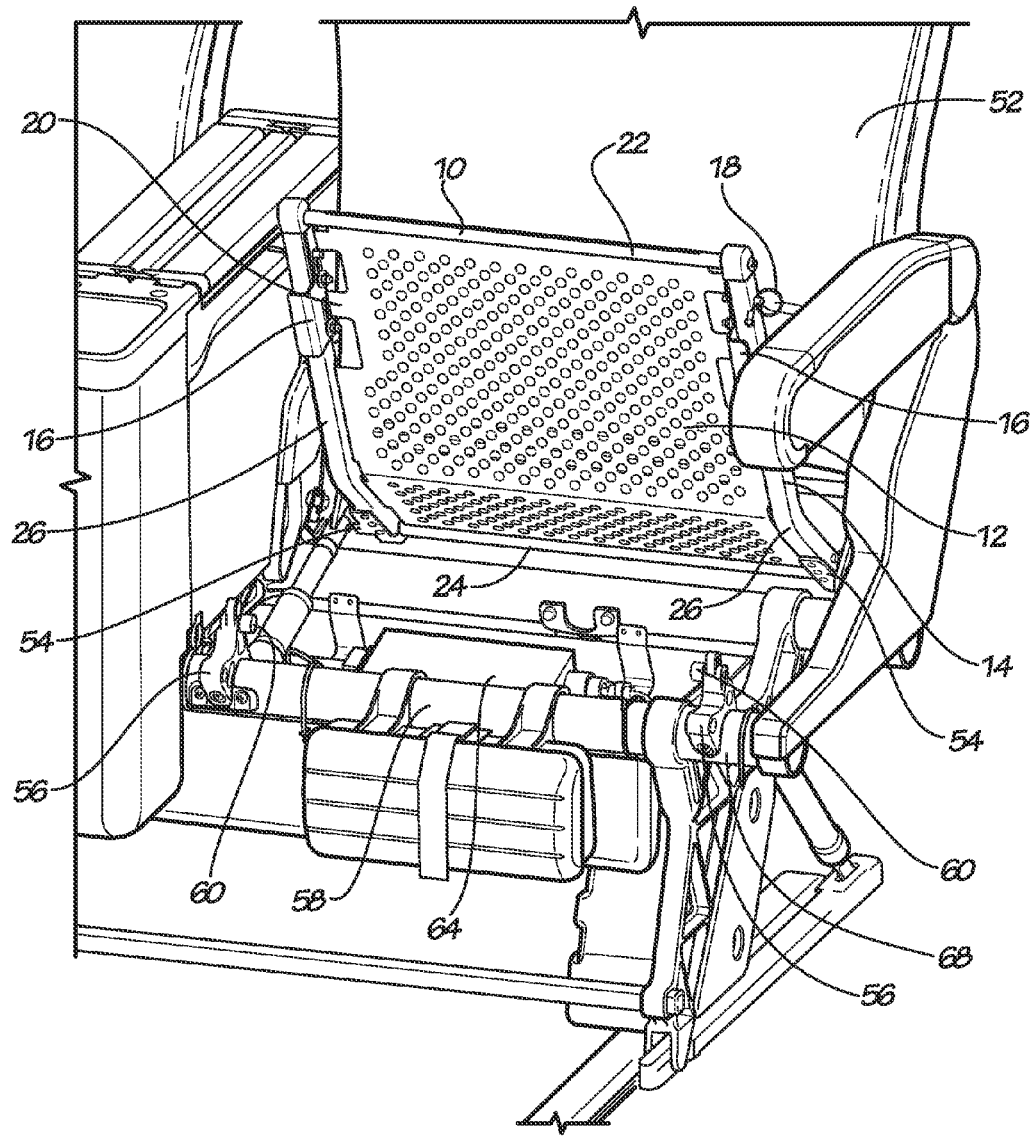
FIG. 6 is a perspective view of the seat pan assembly of FIG. 1 in a disengaged, open position relative to a passenger seat.

In some embodiments, the seat pan assembly 10 is pivotally coupled to a seat frame 68 of a passenger seat 52 via a pair of pivot couplings 54 that are located adjacent the aft bar 24. The pair of pivot couplings 54 allow the seat pan assembly 10 to pivot from a closed position (as shown in FIG. 1) to an open position (as shown in FIG. 6). One of ordinary skill in the relevant art will understand that the seat pan assembly 10 may be coupled (pivotally or otherwise) to the seat frame 68 via any suitable mechanical fasteners and in any suitable location on the seat pan assembly 10 and the seat frame 68.

Figure 3:
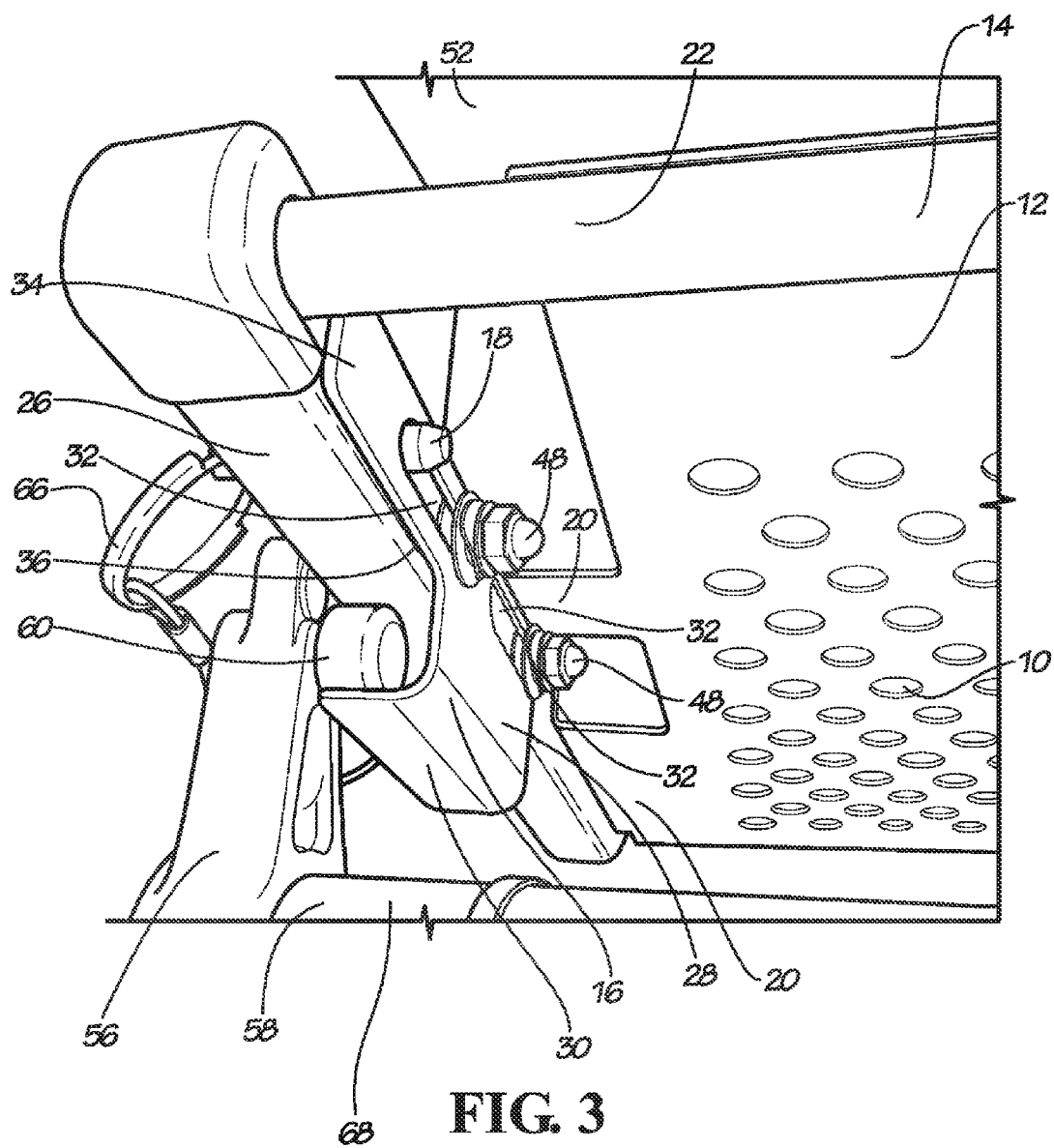
FIG. 3 is a partial perspective view of the seat pan assembly of FIG. 1 in an engaged, closed position relative to a fully upright passenger seat.
Figure 4:
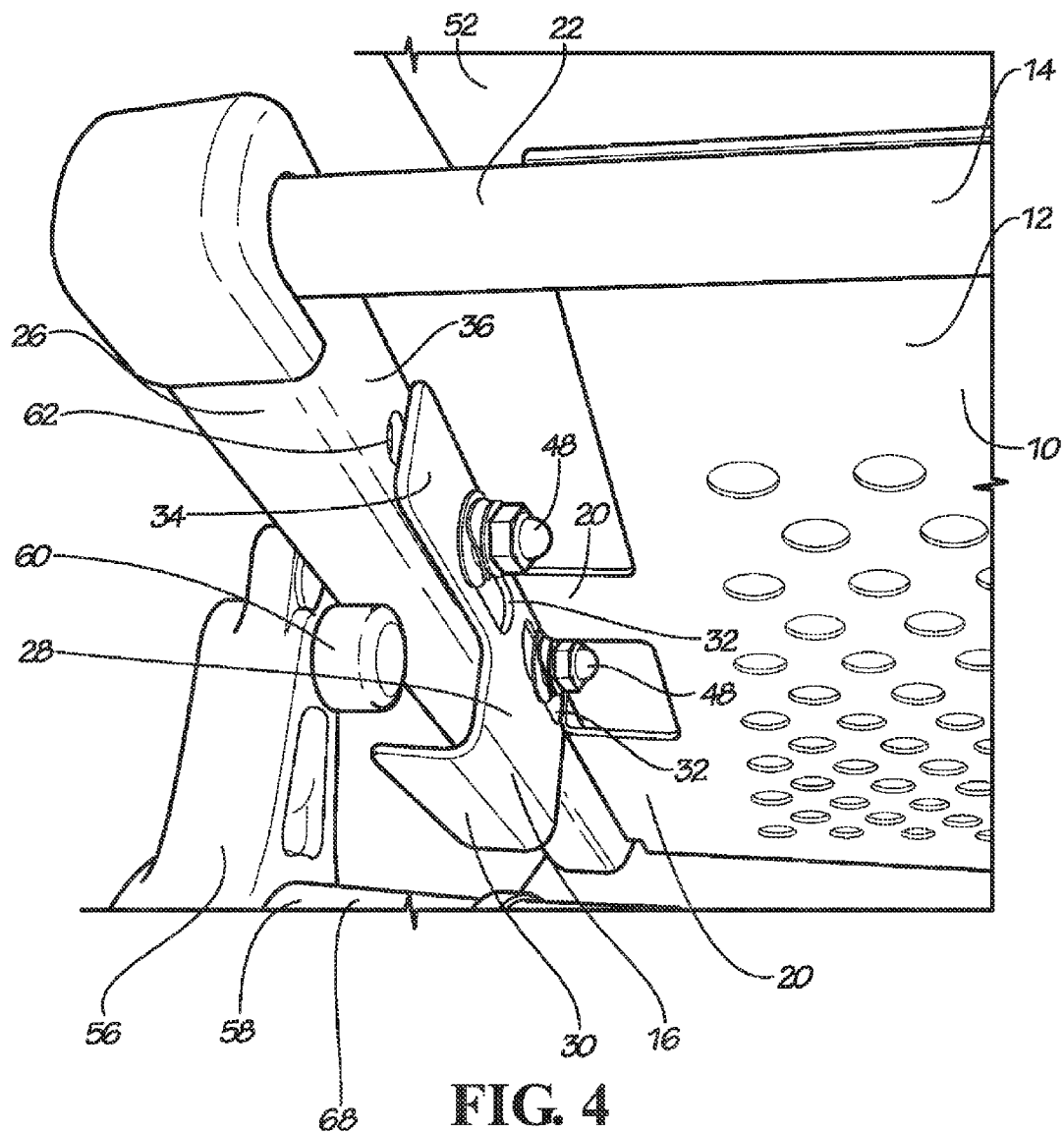
FIG. 4 is a partial perspective view of the seat pan assembly of FIG. 1 in a disengaged, closed position relative to a passenger seat.
Figure 5:
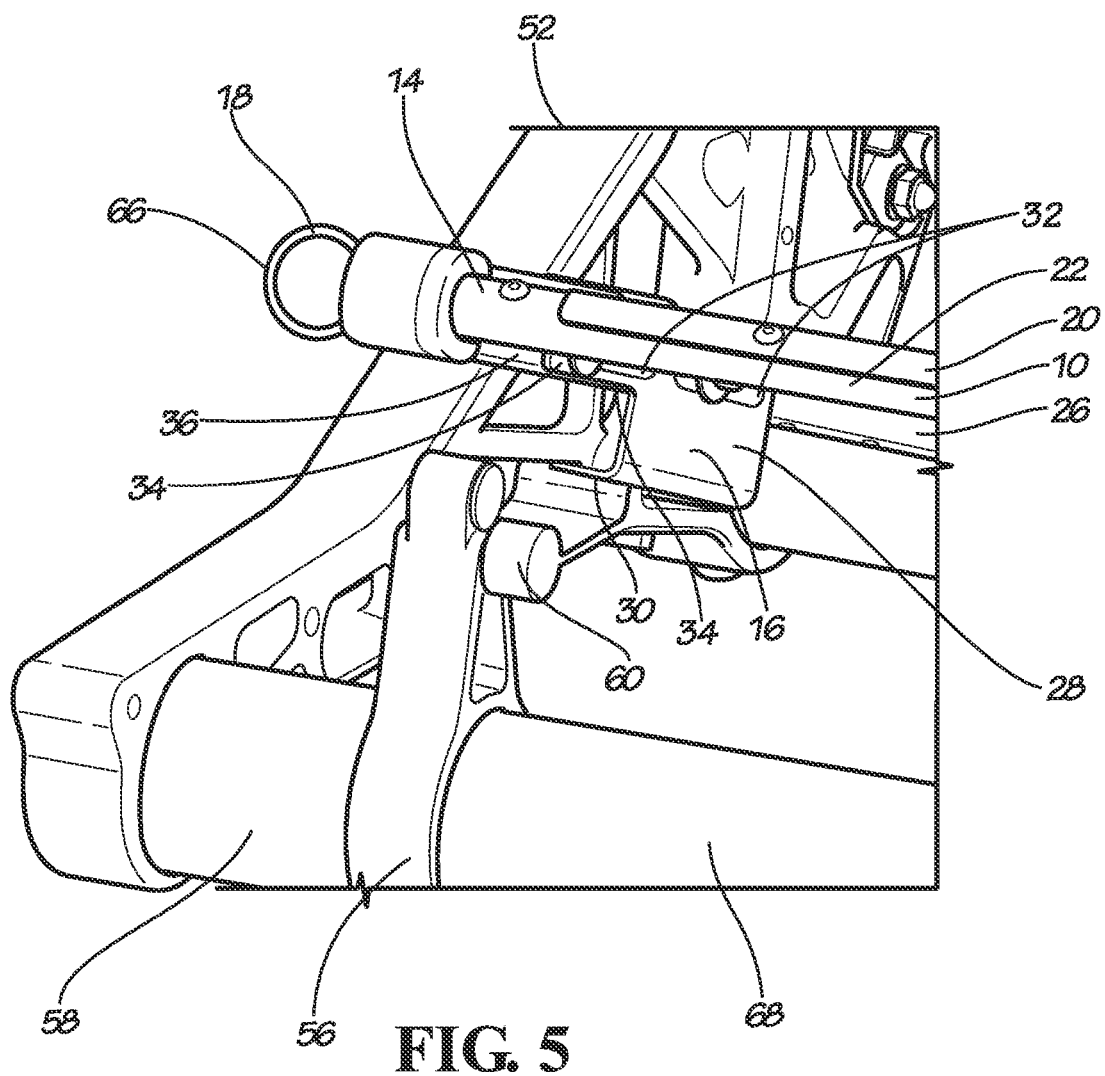
FIG. 5 is a partial perspective view of the seat pan assembly of FIG. 1 in a disengaged, slightly raised position relative to a passenger seat.

As shown in FIGS. 3-5, the seat frame 68 includes at least one coupling projection 56 adjacent a forward base frame tube 58 and may include a gliding device 60. The seat pan assembly 10 is releasably coupled to the seat frame 68 adjacent the forward base frame tube 58 by releasably coupling the coupling retainer 16 to the coupling projection 56. The gliding device 60 is configured to be received in the space created between the side bar 26 and the location of the lip 30.

In the particular embodiment shown in FIGS. 1-6, the gliding device 60 is a roller and the coupling retainer 16 is a lip. However, one of ordinary skill in the relevant art will understand that any suitable combination of types of gliding devices 60 and coupling retainers 16 may be used that releasably engage the seat pan assembly 10 to the seat frame 68, while allowing the seat pan assembly 10 to move forward and aft as needed when the passenger seat 52 moves between reclined and upright positions. Such combinations of coupling devices include but are not limited to a glider/ramp combination, a pin/slot combination, a roller/lip combination, or other similar combinations of coupling devices.

In some embodiments, when the seat pan assembly 10 is in the closed position (as shown in FIG. 1), the coupling retainer 16 is located in an engaged position so that the mechanical fasteners 38 and fastening nuts 48 are positioned at the aft end of each of the at least two slotted holes 32 (as shown in FIG. 3). The coupling retainer 16 is then locked into the engaged position via the locking device 18. In some embodiments, such as the embodiment illustrated in FIGS. 2, 3, and 5, the locking device 18 is a quick release pin. However, one of ordinary skill in the relevant art will understand that other suitable locking devices 18 may be used, including but not limited to locking cotter pins, ball lock pins, S hooks, or other similar quick release fasteners.

In the embodiment shown in FIGS. 1-6, the coupling retainer 16 comprises a pair of coupling retainers 16, a pair of coupling projections 56, and one locking device 18 used to secure each coupling retainer 16 to each coupling projection 56. However, one of ordinary skill in the relevant art will understand that other embodiments are possible where a single coupling retainer 16/coupling projection 56 combination is used, such as where the coupling retainer 16/coupling projection 56 combination may be positioned in a central forward location, or where more than two coupling retainers 16/coupling projections 56 combinations are used. Likewise, other suitable combinations may be used where more than one locking device 18 is used to secure each coupling retainer 16 to each coupling projection 56. Thus, one of ordinary skill in the relevant art will understand that any suitable combination of locking devices 18, coupling retainers 16, and coupling projections 56 may be used as needed to releasably secure the seat pan assembly 10 to the seat frame 68.

In the embodiment best illustrated in FIGS. 2 and 4, the locking device 18 is inserted into an aperture 62 in the locking receiver 34 located forward of the aperture 40 on the side bar 26. The locking device 18 then passes through the forward slotted hole 32 at the forward end of that hole, thus locking the coupling retainer 16 in the engaged position (as shown in FIG. 3). When the coupling retainer 16 is locked into the engaged position, the seat pan assembly 10 is allowed to move forward and aft along the length of the lip 30 as required by the reclining motion of the passenger seat 52. However, the seat pan assembly 10 is prevented from pivoting to the open position by the locked, engaged position of the coupling retainer 16. The seat pan assembly 10 is therefore locked in a closed position relative to the seat frame 68 during normal use for safety concerns related to the removal of the bottom cushions.

In other embodiments, the coupling retainer 16 is pivotally coupled, as opposed to slidingly coupled, to the side bar 26. In these embodiments, the coupling retainer 16 is rotated into the engaged position relative to the coupling projection 56. The coupling retainer 16 is then locked into the engaged position via the locking device 18 that prevents the coupling retainer 16 from pivoting away into a disengaged position during normal use.

In some embodiments, an IFE display may be included with the passenger seat 52. An IFE box 64 may be attached to the seat frame 68 below the seat pan assembly 10 to provide the passenger more leg room and baggage space underneath the seat. In order to access the IFE box 64, a technician needs to position the seat pan assembly 10 in the open position (as shown in FIG. 6). In the embodiments where seat pan assembly 10 and the seat frame 68 are releasably coupled via a roller/lip combination of the coupling devices, the technician positions the passenger seat 52 in a fully upright position which places the gliding device 60 in the most forward position relative to the coupling retainer 16 (as shown in FIG. 3). The technician then disengages the locking device 18 from the coupling retainer 16. In some embodiments where two or more coupling retainers 16 are used, the technician disengages each locking device 18 from each coupling retainer 16. In the particular embodiment shown in FIGS. 1-3 and 5, the locking device 18 is easily disengaged by pulling a loop 66 that is attached to one end of the locking device 18. The technician then slides the coupling retainer 16 from the engaged position (as shown in FIG. 3) to a disengaged position (as shown in FIG. 4) so that the coupling projection 56 is no longer engaged by the coupling retainer 16. Once the coupling projection 56 is free of the coupling retainer 16 (as shown in FIG. 5), the technician is able to rotate the seat pan assembly 10 upward to the open position (as shown in FIG. 6) and easily access the IFE box 64. The seat pan assembly 10 is then re-connected by returning the passenger seat 52 to a fully upright position (if needed), rotating the seat pan assembly 10 to the closed position relative to the seat frame 68, sliding the coupling retainer 16 to the engaged position, and inserting the locking device 18.

In other embodiments, such as the embodiment where the coupling retainer 16 is pivotally engaged with the coupling projection 56, the technician simply disengages the locking device 18 from the coupling retainer 16 but does not necessarily have to return the passenger seat 52 to a fully upright position before doing so because the coupling retainer 16 swings away from the coupling projection 56 when disengaged as opposed to sliding to a disengaged position.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A passenger seat comprising:
   (a) a seat frame comprising at least one coupling projection; and
   (b) a seat pan assembly comprising:
      (i) a seat pan;
      (ii) a pan frame comprising at least one coupling location and a locking location spaced apart from the at least one coupling location by a distance;
      (iii) at least one coupling retainer comprising a main body having at least one slotted hole, wherein a length of the at least one slotted hole is at least as long as the distance between the locking location and the at least one coupling location, and a lip located below the main body, wherein the at least one slotted hole is slidingly coupled to the at least one coupling location; and
      (iv) a locking device configured to be inserted through the locking location in the pan frame and the at least one slotted hole in the at least one coupling retainer;
   wherein insertion of the locking device is configured to retain at least a portion of the lip below the at least one coupling projection so that the seat pan assembly is allowed to slide forward and aft but prevented from rotating away from the seat frame.

2. The passenger seat of claim 1, wherein the at least one slotted hole is slidingly coupled to the at least one coupling location via a fastener that is configured to exert a force of less than 30 pounds to maintain a tight coupling between the at least one coupling retainer and the pan frame.

3. The passenger seat of claim 1, wherein the at least one coupling projection comprises a roller.

4. The passenger seat of claim 1, wherein the locking device is a quick release pin.

5. The passenger seat of claim 1, further comprising a box coupled to the seat frame below the seat pan assembly.

6. The passenger seat of claim 5, wherein the box comprises in-flight entertainment equipment.

7. A passenger seat comprising:
   (a) a seat frame comprising at least one coupling projection; and
   (b) a seat pan assembly comprising:
      (i) a seat pan;
      (ii) a pan frame comprising at least one side bar, wherein the at least one side bar comprises at least one coupling location and a locking location;
      (iii) at least one coupling retainer comprising a main body having at least one slotted hole and a lip located below the main body, wherein the at least one slotted hole is slidingly coupled to the at least one coupling location; and
      (iv) a locking device configured to be inserted through the locking location in the at least one side bar and the at least one slotted hole in the at least one coupling retainer;
   wherein insertion of the locking device is configured to retain at least a portion of the lip below the at least one coupling projection so that the seat pan assembly is allowed to slide forward and aft but prevented from rotating away from the seat frame.

8. The passenger seat of claim 7, wherein the at least one coupling projection comprises a roller.

9. The passenger seat of claim 7, wherein the locking device is a quick release pin.

10. The passenger seat of claim 7, further comprising a box coupled to the seat frame below the seat pan assembly.

11. The passenger seat of claim 10, wherein the box comprises in-flight entertainment equipment.

12. A method of disengaging a seat pan assembly from a passenger seat, the passenger seat comprising a seat frame comprising at least one coupling projection and the seat pan assembly comprising (i) a seat pan, (ii) a pan frame comprising at least one coupling location and a locking location, (iii) at least one coupling retainer comprising a main body having at least one slotted hole and a lip located below the main body, and (iv) a locking device inserted through the locking location and the at least one slotted hole, wherein at least a portion of the lip is positioned below the at least one coupling projection, the steps comprising:
   (a) removing the locking device from the at least one slotted hole;
   (b) sliding the at least one coupling retainer relative to the pan frame until the lip is not positioned below the at least one coupling projection;
   (c) rotating the seat pan assembly away from the seat frame to an open position;
   (d) rotating the seat pan assembly toward the seat frame to a closed position;
   (e) sliding the at least one coupling retainer relative to the pan frame until at least the portion of the lip is positioned below the at least one coupling projection; and
   (f) inserting the locking device through the locking location and the at least one slotted hole so that the seat pan assembly is allowed to slide forward and aft but prevented from rotating away from the pan frame.

13. The method of claim 12, further comprising the step of accessing a box comprising in-flight entertainment equipment stored below the seat pan assembly.

\* \* \* \* \*